INVENTORS
GUSTAV M. ANDREW
JOHN M. JOHNSON JR.
BY
ATTORNEY

United States Patent Office 3,279,725
Patented Oct. 18, 1966

3,279,725
FLIGHT CONTROLLER FOR FLEXIBLE VEHICLES
Gustav M. Andrew, Fullerton, and John M. Johnson, Jr.,
Long Beach, Calif., assignors to North American Aviation, Inc.
Filed Dec. 11, 1963, Ser. No. 329,849
4 Claims. (Cl. 244—77)

The device of the subject invention relates to an improved flight controller, and more particularly to means for improving the controlled response of a flexible aerospace vehicle such as an airplane and the like.

In the flight control of airplanes and the like, it is desired to conveniently induce pitching moments and vertical accelerations in order to effect and maintain a preselected or desired flight path. At the same time it is desired to minimize the response of the controlled vehicle to moments and accelerations induced by atmospheric turbulences (known as "gusts"), for the reason that such gusts produce discomfort to human passengers; alter the flight trajectory; and may apply incremental accelerations which, when added to pilot-induced command accelerations, may exceed the safe structural limits of the vehicle.

In the prior art of rigid airframes, such command control has been effected through a set of elevators, for example, the controlled displacement of which exert both lift (e.g., normal acceleration) upon, and pitching moments about, the center-of-gravity of the aircraft. Closed loop control arrangements have been employed for improving the speed of response to command inputs, and for augmenting the flight stability performance or damping.

Gust alleviation devices for such prior art rigid airframes have variously employed sensing means for resisting and regulating aircraft response to normal accelerations, employing pilot-initiated, control-stick operated signalling or switching devices, whereby the aircraft regulating means is disabled during pilot-induced accelerations. Hence, no gust alleviation occurs during the performance of a pilot-induced maneuver. Other types of control systems have not distinguished between the sources of the acceleration, but have only sought to limit it, thereby compromising the aircraft response to a command input, in order to achieve gust alleviation.

Accordingly, it is a broad object of the subject invention to provide improved flight control means for effecting gust alleviation while not compromising vehicle response to a command-control input.

With the advent of supersonic aircraft and the trend toward large boosters on aerospace vehicles, control of such vehicles has become more severe due to the extreme flexibility of the associated airframe structure. For example, a supersonic airplane necessarily has a long, slender structure in order to reduce drag, whereby high speeds may be achieved. Such slender structure is subject to bending, or the excitation of structural modes of vibration in response to applied accelerations—whether such accelerations arise from gusts or pilot-command-inputs. In other words, when the pilot commands a desired maneuver, the flexible aircraft may only bend, rather than changing its flight path; or at least may not wholly respond as intended.

In addition, because of its higher speeds, the thin, flexible, supersonic aircraft experiences greater accelerations upon encountering a gust than does a low-speed airplane, because accelerations due to gusts are proportional to flight velocity. Such fact is to be appreciated from the analogy of a bump in a road (corresponding to a gust in the atmosphere) which is encountered by a fast and slow vehicle respectively, the first mentioned vehicle experiencing the greater jolt.

Such larger acceleration response to gusts, in addition to increasing passenger discomfort caused by gusts, will also excite the structural bending and vibration modes of the supersonic aircraft. The excitation of such structural modes increases passenger discomfort, due to the periodic structure displacement. Moreover, the excitation of such modes induces structural fatigue in the airframe. It is to be appreciated that the acceleration ($\ddot{X}$) is proportional to the displacement (X) and the square of the frequency ($\omega$) of such mode:

$$\ddot{X}(t) = \frac{d^2(X \sin \omega t)}{dt^2} = -\omega^2 X \sin \omega t$$

$$|\ddot{X}| = \omega^2 |x|$$

Hence, the combined acceleration load upon the airframe due to a commanded maneuver and a gust is increased by the amount of the structural mode. In other words the allowable command maneuver is reduced by the amount of the structural mode.

In the case of aerospace vehicles employing large boosters, the effects of a flexible vehicle are aggravated. Due to the fact that such boosters are located at extremities of the airframe in the manner of a cantilevered load, the excitation of a vibrational mode produces the effect similar to a vibrating spring board excited by the weight of a jumping gymnast. Hence, it is to be appreciated that the problems of passenger discomfort, structural fatigue, and vehicle flight path control are aggravated in the design of aerospace vehicles employing boosters.

Prior art flight control systems for providing gust alleviation, have achieved controlled responses to command inputs and minimized vehicle response to gusts by closed-loop means effecting actuation of lift-producing and moment-producing actuators and control surfaces. However, such prior-art control systems have been intended for use with substantially rigid airframes, and have not proposed to cooperate with flexible airframes so as to prevent the effects due to airframe structural flexibility.

In those cases where the structural vibration modes of the aircraft lie within the spectra or bandwidth of the desired flight control system response, and were detected by the flight control sensors (e.g., accelerometer and rate gyros, etc.) necessarily mounted on the airframe, then such structural mode was said to be coupled with the rigid body modes (i.e., flight path control modes). Where the response of a flight control system to a sensed structural vibration mode responds in such a manner as to further excite the structural mode, such coupling of the structural vibration modes and the flight control system may cooperate to cause signal saturation of the control system so as to prevent the exercise of control functions, or may even cause damage and destruction of the airframe due to accelerated structural fatigue.

In the prior flight control art, decoupling of the flight control system and the vehicle structural mode has been variously attempted. One such prior art means of decoupling has been attempts to locate sensors at those stations along the airframe at which such structural modes are least pronounced. Such approach is of limited value because such desired installation locations may not be accessible or available to the flight control system designers, due to other considerations in the overall design of the airplane. For example, a flight control gyro cannot be mounted within a space occupied by a fuel tank.

Another prior art means is the limiting of the frequency-response of the vehicle flight-controller to frequencies below those at which the structural vibration modes occur. In this way, even though the vibration modes are excited by the action of the flight controller, yet the structural modes cannot cooperate with the flight controller so as to substantially effect the response of the flight controller. However, as the desired dynamic response of the vehicle is increased and as the vehicle becomes more flexible, the frequencies of the airframe structural modes tend to lie within the spectra or bandwidth of the flight control system frequency response. Therefore, the prior flight control art alternatively employed notch filters in the flight control system feedback loops, to attenuate the response of the flight control system to the structural modes sensed by the flight control sensors, the notch frequency of the filters being selected to be the same as the frequency of the structural mode.

Such prior-art decoupling arrangement, it is noted, only attenuates the flight control system response to the structural mode; and does not prevent the excitation of the structural mode. Therefore, such prior art arrangements do not enhance the controllability of a flexible airframe which tends to bend (rather than to alter its flight path) in response to flight path command control inputs. Also, such prior art arrangement does not improve gust alleviation performance of a controlled airframe which tends to bend rather than to alleviate the open-loop response of the vehicle to a gust. Further, such control system, in not preventing the excitation of such structural modes, does not reduce passenger discomfort, nor relieve the structural fatigue induced in flexible airframes by gusts or atmospheric turbulence.

According to the concept of the subject invention, however, gust alleviation and rigidity augmentation are provided, for improving the performance of a flexible aerospace vehicle.

In a preferred embodiment of the invention there is provided a vehicle having a primary control actuator and a secondary control actuator mutually arranged for providing pitching moments of mutually opposite sense, when actuated to provide translational accelerations of like sense. There is also provided a multi-loop control system in cooperation with the primary and secondary control actuators for dynamically augmenting the rigidity of the controlled vehicle. A first loop of such multiple-loop system comprises angular rate sensors and translational acceleration sensing means adapted to sense structural vibration modes of the controlled vehicle occurring in planes parallel to the pitching plane of the vehicle trajectory. First signal combining means responsive to the angular rate sensors and translational acceleration sensor and adapted to be connected to a source of system command input signals provides a first control signal to the primary control actuator.

A second loop of the multi-loop control system comprises the angular rate sensors and an angular accelerometer adapted to sense structural vibration modes occurring to the control plane (or pitching plane). Second signal combining means responsive to the angular rate sensors and angular accelerometer sensor provides a second control signal to the secondary control actuator.

In normal operation of the above described arrangement, the primary control actuator responds to the associated negative feedback signals from the sensors so as to induce compensatory accelerations tending to compensate for, or reduce, sensed translational accelerations caused by either gusts (turbulence of the medium through the vehicle is travelling) or structural vibration of the vehicle which are sensed by the sensors. The secondary control actuator responds to the associated negative feedback signals from the sensors to induce compensatory pitching moments tending to compensate for or reduce the pitching moments produced either by gusts or by the response of the primary control actuator, or by structural bending modes sensed by the angular motion sensors. Hence, the compensatory response of the multiple-loop system increases the effective rigidity of the airframe, improving the trajectory control thereof; and alleviates or reduces the response of the airframe to gusts. Accordingly, it is an object of the subject invention to provide an improved flight controller for use with flexible aircraft.

It is another object of the subject invention to provide closed loop control means for improving the trajectory control of a flexible vehicle.

It is yet another object of the invention to provide control means for dynamically augmenting the structural rigidity of a controlled vehicle.

It is a further object of the invention to alleviate the response of a flexible vehicle to gusts occurring in the medium through which the vehicle is travelling.

These and further objects of the invention will become apparent from the following specification, taken in conjunction with the accompanying drawings in which.

Figure 1:
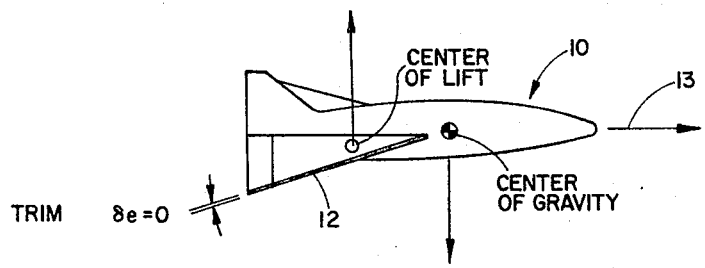
FIG. 1 is an illustration of a rigid vehicle in level flight, showing the relative locations of the center of lift and center of gravity.

Referring now to FIG. 1, there is illustrated a rigid vehicle such as an aircraft 10, the center of lift thereof being aft of the center of gravity, as is usual, in accordance with the design requirements for static flight control stability. For straight and level flight of exemplary aircraft, as illustrated, the primary control surfaces or elevons 11 at the trailing edge of the main aerodynamic lifting surfaces or wings 12 are shown in a trim position (indicated by the angle, $\delta_e = 0$), whereby pitching moments about the center of gravity are balanced or "trimmed" so as to maintain a horizontal flight path or velocity vector 13. Maneuvers or changes in the orientation of the velocity vector are achieved by angular deflection of the elevons, which alter the lift induced by the primary lift surfaces. Such change in lift acting through the effective center of lift, which is at a distance from the center of gravity, produces a pitching moment of the aircraft in the direction of a desired flight path; after which the elevons are retrimmed, as is well understood in the art of flight control of rigid airframe.

A positive or clockwise deflection of the elevons from the trim position, as illustrated in FIG. 1, would produce a counter-clockwise or pitch-up maneuver of aircraft 10, while a negative or counter-clockwise deflection would produce a negative or pitch-down maneuver.

Figure 2A:
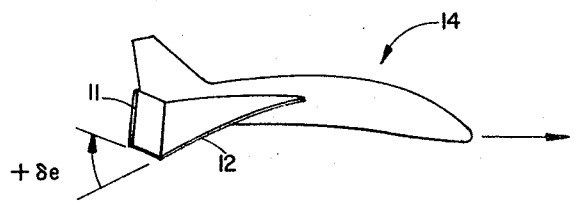
FIGS. 2a and 2b are illustrations of a flexible vehicle deformed by the application of a primary control force.
Figure 2B:
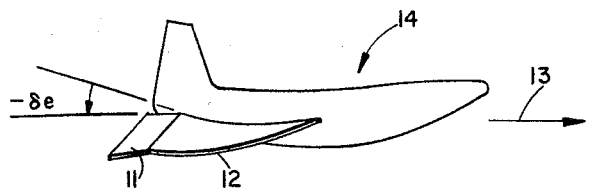

In the case of a flexible vehicle, as illustrated in FIGS. 2a and 2b, the distribution of masses (or gravity loads) and aerodynamic forces cause structural deformation of the vehicle. Further, attempts to maneuver the vehicle by means of deflections of the control surfaces serve to effect further structural deformation and excited structural vibration modes. For example, in the case of the positive deflection of the elevons 11 of flexible vehicle 14 illustrated in FIG. 2a, the vehicle is seen to respond, the aft end thereof bending downward in response to the downward incremental aerodynamic force induced on the main lift surface in the region of the elevons. As a consequence, the local angle of attack of the control surfaces 11 relative to the aircraft relative wind or flight path 13, is reduced. In other words, the cooperation of the structural bending mode (of the flexible vehicle) with the deflection of the control surfaces reduces the trajectory control of the control surfaces upon the vehicle.

FIG. 2b similarly illustrates the effect of a negative deflection of the elevons or primary control surfaces upon a flexible vehicle, the aft end of the vehicle bending upwards in response to the upward aerodynamic force induced by the control surface deflection. Further, such bending of the fuselage is observed to reduce the local angle of attack of the elevons, whereby the effect thereof upon the vehicle trajectory is attenuated.

It is to be further appreciated from FIGS. 2a and 2b that the occurrence of a gust or atmospheric turbulence in the air encountered by the flexible vehicle will similarly induce structural deformations which will alter the effect of the control surfaces upon the vehicle trajectory. In fact, the encountering of such atmospheric anomalies will excite vibration, or cyclical bending, as to induce erratic deviations from the intended flight path, induce passenger discomfort, and induce structural fatigue of the vehicle. The effects of such vertical gusts upon the vehicle deformation are manifested in two ways. One manifestation is angular deformation of the structure at certain points or stations along the airframe, called nodes. Another manifestation is a translation deflection occurring at certain stations along the fuselage called anti-nodes. At stations intermediate the nodes and anti-nodes both translation and angular deformation are manifested, as shown in FIG. 4.

Figure 4:
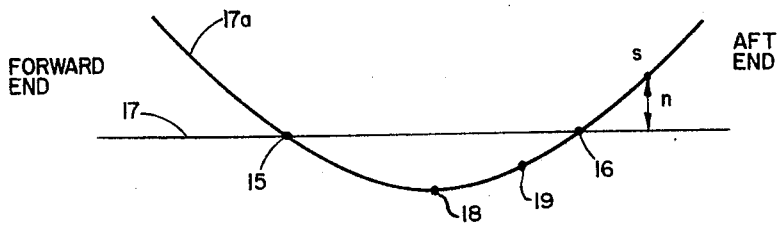
FIG. 4 is a diagram of an exemplary primary or first bending mode.

Referring to FIG. 4, there is illustrated a representation of the longitudinal axis of a flexible fuselage having a single or main bending mode. Such single bending mode is indicated by the two nodes 15 and 16 located along the longitudinal axis 17, about which two points angular deformation occurs. Point 18, midway between points 15 and 16, experiences mainly a translational deflection during vibrations or periodic deformation associated with such bending mode.

The angular deformation occurring at each of nodes 15 and 16 is of mutually opposite sense. For the upward bending of the extremities of axis 17 in FIG. 3, for example, the angular deformation about node 15 is clockwise, and the corresponding angular deformation about node 16 is counter-clockwise. Further, angular deformations of varying degree occur along the entire length of flexible axis 17a, being least near anti-node 18, and reversing in sense at such point.

The translational deflections of flexible axis 17a (relative to the undeformed shape, 17) occurring at the extremities of axis 17a are of like sense, the sense of the translational deflection along that portion of axis 17a between nodes 15 and 16 being of an opposite sense.

Hence, it is to be appreciated that if a sensor package containing, for example, a pitch rate gyro, an angular pitch accelerometer and a translational normal accelerometer, were mounted on fuselage axis 17a (of FIG. 4) at station 19 (representing neither a node nor anti-node), then both angular and corresponding translational output signals would be provided by the sensor package, in response to the fuselage vibration mode. Such signals may then be suitably combined and fed to appropriate control means located at either extremity of the fuselage (i.e., on either side of the center of gravity) as shown by the canard arrangement of FIG. 3, for example, for generating counter-moments for resisting such structural deflection.

In practice, the flexible vehicle may demonstrate more than one structural vibration mode. In other words, the structural members of an airplane fuselage are subject to more complicated modes than the simple harmonic motion suggested in the description of FIG. 4. Such variation in the nature of the bending mode occurs due to the random nature of the gusts which excite such structural modes. Such random excitation effects the time history of the amplitude and phase response of the aeroelastic modes to the control system. Hence, in the cooperation of fuselage-mounted sensors with the aircraft controls for suppressing structural modes, it is necessary to properly locate the sensor package upon the fuselage.

The section of fuselage along which a station is selected for mounting the sensor package, is one for which each sensor will provide an output of like sense or phase for each of the modes to which it is subjected. In this way the use of a preselected sense convention for the controller response for one mode (and also for closed-loop vehicle trajectory control) may be equally suitable for suppression of other modes, as shown in FIG. 5.

Figure 5:
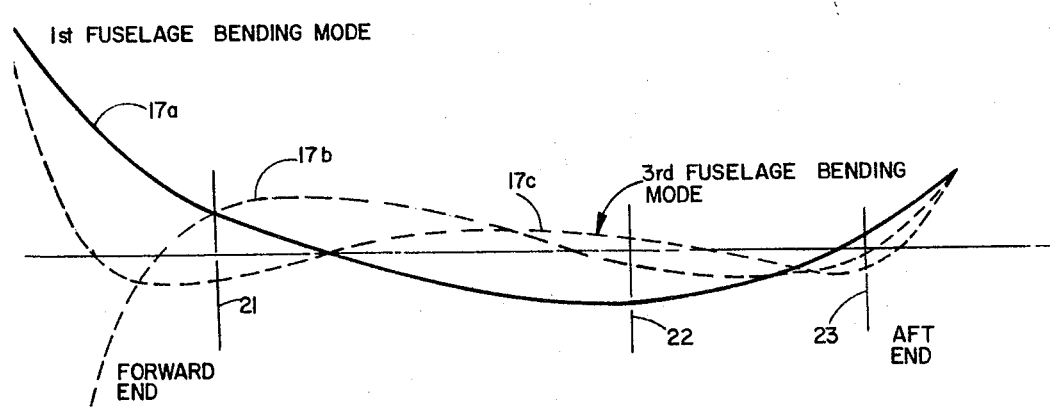
FIG. 5 is a diagram of a representative flexible fuselage having three bending modes, illustrating the preferred locations of sensors for sensing such combined structural phenomenon.

Referring to FIG. 5, there is illustrated the axis 17 of a flexible aircraft fuselage having a first, second and third bending mode alternatively, and indicated by curves 17a, 17b, and 17c, respectively. The difference in shape of each mode relative to the others is manifested differently at different stations. For example, at station 21 along fuselage 17 in FIG. 5, the first bending mode 17a demonstrates a clockwise angular deflection rate concurrent with a positive (upward) translational deflection rate. The second bending mode 17b demonstrates a counter-clockwise angular rate with positive (upward) translational deflection rate. Hence, control reversal would occur, whereby control action to suppress vibration in one mode would in a second mode be self-compromising, as to be ineffective, or even serve to reinforce such second resonant mode to the point of causing structural failure.

It is observed that the sense of the translational deflection rate of the third mode 17c at station 21 is of opposite sense to those of the first and second modes, 17a and 17b, suggesting that the proper response of the control system to alleviate a gust may, in one case, alleviate the structural bending and, in the other case, may aggravate it.

Accordingly, it is to be understood that fuselage sections comprising station 21 in FIG. 5 (e.g., fuselage sections toward the bow or forward end) are not preferred sections for location of the sensor package. Similarly the section represented by station 22 in FIG. 5 is seen not to be a preferred sensor station, for like reasons.

However, for fuselage stations aft of station 23 in FIG. 5, it is noted that the signs or sense of the slopes of the structural deflection associated with each of the several structural modes is the same. Hence, the use of rate and acceleration sensors for damping and anticipation of flexible structural effects can be employed with fixed sense conventions in cooperation with a control system for all of the representative modes illustrated in FIG. 3. Accordingly, station 23 represents a preferred station for installation of the sensor package.

Figure 3:
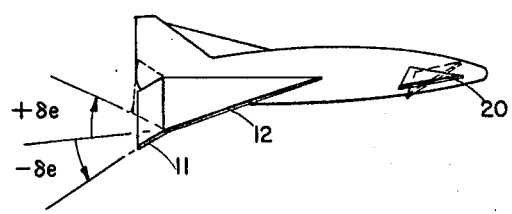
FIG. 3 is an illustration of the flexible vehicle of FIGS. 2a and 2b, with the addition of secondary or canard control means for augmenting the rigidity of the vehicle.

The basic means of suppressing the bending modes augmenting the structural rigidity of a flexible vehicle are shown in FIG. 3.

Referring to FIG. 3, there is illustrated the flexible vehicle of FIGS. 2a and 2b with the addition of secondary or canard control means for augmenting the rigidity of the vehicle. It is to be appreciated that bending of the fuselage of the vehicle in FIG. 3 may be accomplished by cooperation of the primary and secondary control means, whereby like changes in lift produced by actuation of the primary and secondary control surfaces will produce pitching moments of mutually opposite sense. For example, if each of control surfaces 11 and 20 (in FIG. 3) is actuated to provide an increase in lift, the primary control surface (as illustrated in FIG. 3) will tend to generate a clockwise moment, due to the vehicle center of lift being aft of the vehicle center of gravity (C.G.). The incremental lift contributed by concurrent actuation of the secondary control surface is somewhat negligible; however, because of the relatively large moment arm or distance of the canard surface forward of the C.G., relatively large pitching moments can be generated. Therefore, for a positive increment in lift resulting from proper activation of the canard control surface 20, a counter-clockwise pitching moment will be induced. The effect of such pitching moments of mutually opposite sense, induced at opposite ends of the fuselage, will tend to cause the flexible vehicle to sag amidship and flex upwardly at the fore and aft extremities thereof. Hence, it is to be similarly understood that like negative increments of lift provided by concurrent or synchronous action of the primary and secondary vehicle controls would cause "hogging" or a drooping of the fore and aft sections of the fuselage relative to the midship section.

Accordingly, it is to be appreciated that the illustrated primary and secondary control means of FIG. 3 may be actuated in synchronism to provide a compensatory bending, in suppressing a sensed bending mode. Such concurrent actuation of the primary and secondary control means would preferably be in synchronism with the sensed bending mode as to induce a bending of opposite phase or sense to that of the sensed bending mode. In this way the net bending of the airframe in response to externally applied forces and modes is reduced. In other words, the rigidity of the structure may be augmented by the cooperation of a sensor package (suitably mounted beween a node and anti-node) and the primary and secondary control means.

The use of properly located sensing instruments to provide control loop feedback signals for dynamic rigidity augmentation can be demonstrated analytically. The characteristic equation for a structural mode, having a natural frequency $W_n$ and a damping ratio, $\zeta$, may be written as follows:

$$\ddot{n} + 2\zeta W_n \dot{n} + W_n^2 n = 0 \quad (1)$$

Where $n$ = structural deflection
$\dot{n}$ = rate of structural deflection and
$\ddot{n}$ = acceleration of the structural deflection Where actuation of the vehicle control means provides a forcing function or source of excitation of the bending mode of Equation 1, such effect is shown by adding the expression for the forcing function term to the righthand member of Equation 1:

$$\ddot{n} + 2\zeta W_n \dot{n} + W_n^2 n = K_n \delta_e \quad (2)$$

Where
$\delta_e$ = control means actuation
$K_n$ = gain or effectiveness of the control means upon the structural mode When properly located acceleration, velocity and displacement sensors are employed to provide feedback signals to the vehicle control means, the term $K_n \delta_e$, in Equation 2 can be replaced with such signals as follows:

$$K_n \delta_e = -K_A n - K_V \dot{n} - K_D \ddot{n} \quad (3)$$

Where
$K_A$ = gain of the acceleration sensor
$K_V$ = gain of the velocity sensor
$K_D$ = gain of the displacement sensor The negative signs are employed to indicate negative feedback.

Substituting Equation 3 in Equation 2:

$$\ddot{n} + 2\zeta W_n \dot{n} + W_n^2 n = -K_A \ddot{n} - K_V \dot{n} - K_D n \quad (4)$$

Re-arranging Equation 4:

$$(1+K_A)\ddot{n} + (2\zeta W_n + K_V)\dot{n} + (W_n^2 + K_D)n = 0 \quad (5)$$

$$\ddot{n} + \frac{(2\zeta W_n + K_V)}{(1+K_A)}\dot{n} + \frac{(W_n^2 + K_D)}{(1+K_A)}n = 0 \quad (6)$$

$$\ddot{n} + 2\zeta' W_n' \dot{n} + (W_n')^2 n = 0 \quad (7)$$

Where $W_n'=$ $$\left[\frac{W_n^2 + K_D}{1+K_A}\right]^{1/2}$$

$$2\zeta' W_n' = \frac{2\zeta W_n + K_V}{1+K_A}$$

The altered characteristic equation of Equation 7 relative to Equation 1, is seen to provide effective changes to the stiffness and damping of the vibratory or flexible structure (represented by Equation 1), which changes are functions of the gains selected for the feedback signals to the vehicle control means.

The effective structural stiffness, indicated by the term, $W_n'$, in Equation 7, can thus be changed by dynamic manipulation of the vehicle controls in response to sensor signals, and without any "beefing-up" or increase in the airframe structure (in the manner of static reinforcement of structural members) thereby avoiding untoward weight and payload penalties.

The effective damping ratio of the dynamically controlled structure, analytically described by Equation 7, is indicated by the term $\zeta'$, the parameters of which are determined from the damping terms of Equation 7 as follows:

$$2\zeta' W_n' = \frac{2\zeta W_n + K_V}{1+K_A} \quad (8)$$

$$\zeta' = \frac{1}{2}\left[\frac{2\zeta W_n + K_V}{1+K_A}\right] \frac{1}{W_n'} \quad (9)$$

Substituting the definition of Equation 7 for $W_n'$:

$$\zeta' = \frac{(2\zeta W_n + K_V)(1+K_A)^{1/2}}{1(1+K_A)(W_n^2+K_D)^{1/2}} \quad (10)$$

$$\zeta' = \frac{(2\zeta W_n + K_V)}{2[(1+K_A)(W_n^2 K_D)]^{1/2}} \quad (11)$$

Now, the usual structural damping ratio $\zeta$ is of inherently small value (about 0.02). Accordingly, the numerator of Equation 10 is essentially determined by the velocity feedback gain term $K_V$.

Further, the denominator terms of Equation 10 are seen to vary only as the square root of (1) the sum of 1 plus $K$ (the acceleration feedback gain), and (2) the sum of $W_n^2$ plus $K_D$ (the displacement feedback gain). For example, if the acceleration gain $K_A$ were roughly of about the same magnitude as unity, then the sum (1+1) would contribute an effect determined by the inverse of only the *square root* of the sum, or $1/\sqrt{2}$ or .707, an attenuation of only about 30%.

Similarly, in order that the displacement gain $K_D$ substantially effect the magnitude of the term $(W_n^2+K_D)$ in Equation 10, such gain would have to be at least as large as the square of the natural frequency, $W_n$. Such result $(2W_n^2)^{1/2}$ would contribute a similarly small effect as the above example for the gain, $K_A$ (e.g., 30% attenuation in the effective damping ratio).

In other words, the usual range of values to be employed for $K_A$ and $K_D$ would have a lesser effect on the augmented structural damping term $\zeta'$, than would the velocity feedback gain, $K_V$. In practice, therefore, the effect of $K_D$ on such damping term may be small enough as to be neglected (meaning that the displacement signal may be omitted, which is equivalent to ($K_D = 0$)). The value of the acceleration gain $K_A$, however, may be selected from other considerations such as flight path stability, as determined from an analysis of the flight control loop dynamics, as will be more fully explained hereinafter.

Figure 6:
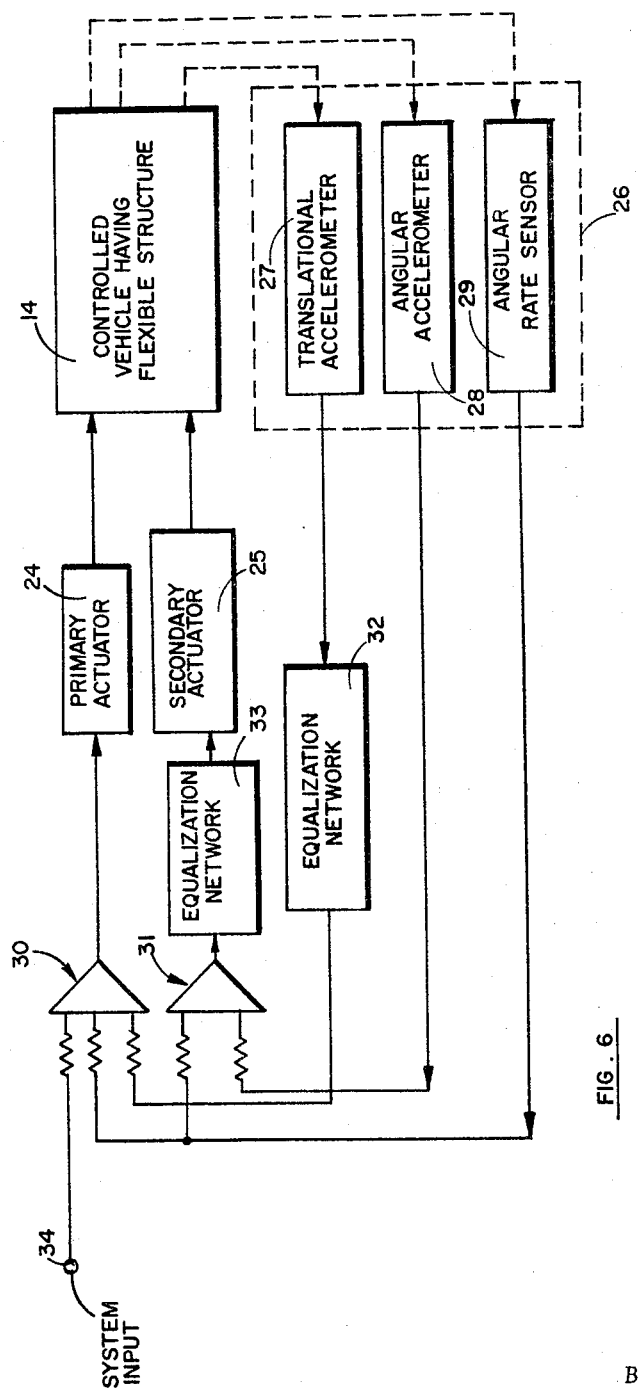
FIG. 6 is a block diagram of a system employing the concepts of the invention.

In the application of the above described concepts to a gust-alleviator flight control system for a flexible vehicle, a translational accelerometer, oriented to measure airframe accelerations in the pitching plane, provides gust alleviation control signals to the primary lift control means of the vehicle, and angular-velocity and angular acceleration signals are fed to the secondary or canard control means of the vehicle for suppression of structural bending and for pitch damping of the vehicle trajectory, as shown in FIG. 6.

Referring to FIG. 6, there is illustrated a block diagram of flight control system for a flexible vehicle, and embodying the concepts of the invention. There is provided primary and secondary actuation means 24 and 25 for actuation of the primary and secondary control surfaces, respectively, of the vehicle of FIG. 3. There is further provided a sensor package 26 comprising a transitional accelerometer 27, angular accelerometer 28, and rate gyro 29, all oriented to measure respective accelerations and angular rates in the pitch plane of a vehicle-to-be controlled 14. Such sensor package is preferably located along the fuselage at a place commonly between a structural node and anti-node of each of the several bending modes of interest (as described in connection with FIGS. 4 and 5).

Due to the position or station of translational accelerometer 27, not being generally at a structural node, such sensor provides an output having a first component due to sensed translation of such station and a second component due to angular motion of such station.

Further, the sense of the first component due to positive motion (upward translation) is the same as that for the second component output produced by the corresponding positive motion (clockwise, or nose-up, pitching). Therefore, vehicle control in response to accelerometer 27 will be of a like sense whether in opposition to structural bending or flight path deviations, regardless of whether the sensed phenomena is translational or angular in nature. Further, due to the similar location of angular sensors 28 and 29, signals of like sense are similarly provided in response to angular motion of a positive sense, whether due to flight deviations or to structural bending.

Primary signal combining means 30 is interposed between the input of primary actuator 24 and the outputs of a command control signal source (not shown), normal accelerometer 27 and pitch rate gyro 29. Secondary signal combining means 31 is interposed between the input of secondary actuator 25 and the outputs of angular pitch accelerometer 28 and pitch rate gyro 29.

A first equalization network 32 may be interposed between the output of accelerometer 27 and the associated input to summing amplifier 30, and a second equalization network 33 may be interposed between the output of secondary signal combining means 31 and the input to secondary actuator 25. Such networks are selected to provide signal-shaping, as required from considerations of flight-control stability for the particular class of aircraft with which the system of FIG. 6 is employed, as is further explained more fully hereinafter. The usual form of such network may, for example, be a simple lag circuit or lag-lead network.

In normal operation of the arrangement of FIG. 6, structural bending of the vehicle is detected by rate gyro 29, which commonly provides negative feedback signals to both primary actuator 24 and secondary actuator 25 in such a sense as to create counter-bending which tends to damp such vibration. Rate gyro 29 also senses pitch rate motion of the aircraft due to changes in vehicle attitude or trajectory, whereby feedback signals are provided for damping of such rigid airframe motion, as is well understood in the flight control art. When, however, it is desired to maneuver the vehicle, a command control input signal is applied at input terminal 34 in FIG. 6, and fed to signal combining means 30 for biasing the input to primary actuator 24. In this way, the effect of the pitch rate feedback signals is to control and damp the vehicle pitch rate about the bias or reference provided by such command input, while continuing to sense and damp structural bending of the vehicle.

The normal accelerometer 27 senses vertical accelerations produced by gusts, and provides a negative feedback signal to primary actuator 24 in such a sense as to induce primary control actuation tending to oppose such gust. Further, due to the location of sensor 27, structural deflections sensed by such sensor will produce feedback signals to actuator 24 which (in cooperation with the feedback signals fed to secondary actuator 25) will tend to oppose structural modes.

The cooperation of angular accelerometer 28 with secondary actuator 25 is to anticipate structural deflections, and to provide a component pitching and/or bending moment which compensates for angular pitching accelerations resulting from encountering a gust.

In other words, where the control action of the primary actuator, in opposing the vertical acceleration effects of a gust, either does not effectively control pitching moments resulting therefrom or else thereby induces undesired pitching accelerations, then a component input to secondary actuator 25 as provided by angular accelerometer 28, causes actuation of the canard surfaces 20 of FIG. 3. Such actuation is of a sense tending to generate a pitching moment which opposes the sensed moment or angular acceleration. The pitch accelerations sensed by sensor 28 may be due either to disturbances of the flight path or to sensed structural deflections.

The cooperation of the accelerometers and actuators in FIG. 6, in providing gust alleviation, do not provide sustained opposition to a commanded pitch rate maneuver for the reason that the pitch acceleration associated with a constant pitch rate is, itself, zero. In other words, the feedback accelerometer feedback signals, in effecting control to a zero or null acceleration, do not prevent a constant rate maneuver. Further, as explained above, the application of the command input to only the primary control actuator serves to bias the pitch rate feedback control, whereby closed loop pitch control is effected about such bias.

Hence, it is to be appreciated that the device of FIG. 6 does not compromise the response of the vehicle to command inputs for performing selected pitch maneuvers. Also, the device of the invention provides both gust alleviation and dynamic rigidity augmentation of a flexible vehicle.

In choosing the gains for the feedback signals from each of the sensors 27, 28 and 29, such choice is made from a consideration of the stability of the closed-loop flight path and attitude control dynamics, as well as from a consideration of the structural modes of the vehicle. In other words, the classical control dynamics of a rigid airframe require that certain limits be placed on the feedback gains employed in the closed-loop flight control system. Further, such consideration of the rigid airframe closed-loop flight control dynamics may also require the addition of signal shaping or compensation networks. In the case of a D.-C. analog system, such networks are essentially frequency sensitive networks. For the usual aircraft, having a lightly damped, low-frequency mode, called the phugoid, the combination of sensors illustrated in FIG. 6 would require that the compensation or equalization networks be of a lag or lag-lead form, as a function of the flight dynamics of the aircraft to be stabilized, as determined from standard servo design criterion. Such techniques are well known to those skilled in the flight control art, and the design of such stabilizing or compensating networks from standard servo stability criterion is demonstrated in any standard text on servo theory, such as, for example, Section 5.5 at pages 302–316 of "Control Systems" by Truxal, published by McGraw-Hill (1955).

Although the described control of aerodynamic control surfaces has been illustrated as adapted to the control of aircraft, it is readily appreciated that such control arrangement is equally applicable to the control of flexible underwater vehicles such as submarines. Further, although the invention has been described in terms of aerospace vehicles employing aerodynamic control surfaces, the concept of the invention is equally applicable to aerospace vehicles employing other types of trajectory controls such as vernier rocket forces and the like.

Accordingly, improved vehicle control means has been described for control of a flexible vehicle, whereby both gust alleviation and dynamic rigidity augmentation is provided, without compromising the response of the vehicle to selected maneuvers.

Although the invention has been illustrated and described in detail, it is to be clearly understood that the same is by way of illustration and example only and is not to be taken by way of limitation, the spirit and scope of this invention being limited only by the terms of the appended claims.

We claim:

1. In a vehicle travelling through a medium and having a primary and secondary actuator means for controlling the trajectory thereof, a multiple-loop control system comprising:
   first feedback signalling means cooperating with said actuator means for attenuating the bending mode response to said vehicle, comprising:
      a plurality of sensors including an angular accelerometer, an angular rate sensor, each of said sensor being oriented and located so as to sense a structural bending mode of said vehicle;
   second feedback signalling means including translational accelerometer means having a time-lagged output and said angular rate sensor for attenuating the response of said vehicle to anomalies in the medium through which said vehicle is travelling;
   primary signal combining means interposed between the input of said primary actuator means and the output of a command signal source, said translational accelerometer means and said angular rate sensor; and
   secondary signal combining means including time-lag means interposed between the input of said secondary actuator means and the outputs of said angular accelerometer and said angular rate sensors.

2. In a vehicle travelling through a medium and having a primary and secondary actuator means for controlling the trajectory thereof, a multiple-loop control system comprising:
   feedback signalling means cooperating with said actuator means for attenuating the bending mode response to said vehicle and comprising a plurality of sensors including a translational accelerometer, an angular accelerometer, an angular rate sensor, each of said sensors being oriented and located so as to sense a fixed relative phase-sense of a common structural bending mode of said vehicle;
   primary signal combining means interposed between the input of said primary actuator means and the outputs of said translational accelerometer and said angular rate sensor;
   time-lag means interposed between said translational accelerometer and said primary signal combining means; and
   secondary signal combining means comprising time-lag means interposed between the input of said secondary actuator and the outputs of said angular accelerometer and said angular rate sensor.

3. In combination, a vehicle comprising a first aerodynamic control surface disposed rearwardly on said vehicle and a second aerodynamic control surface disposed forwardly on said vehicle; and means for simultaneously controlling said aerodynamic control surfaces to reduce the bending of said vehicle, comprising angular rate sensing means for providing signals indicating the angular velocity of at least a portion of said vehicle, translational accelerometer means including time-lag means for providing time-lagged signals indicating the acceleration of at least a portion of said vehicle, and angular acceleration means for providing signals indicating angular acceleration of at least a portion of said aircraft, and wherein said first aerodynamic control surface is responsive to signals provided by said angular rate sensing means and to time-lagged signals provided by said translational accelerometer means, and said second aerodynamic control surface is responsive to time-lagged signals provided by said angular rate sensing means and said angular accelerometer.

4. In a vehicle adapted for travelling through a fluid medium and having a primary and secondary actuator arranged for inducing vehicle pitching moments of mutually opposite sense when actuated to provide changes in normal acceleration of like sense for trajectory control of said vehicle, a multiple-loop control system for attenuating vehicle response to both gusts and vehicle bending modes without compromising vehicle response to an applied command control input, comprising:
   a plurality of inertial sensors comprising an angular accelerometer, angular rate sensor and translational accelerometer, each oriented to sense motion in the pitch plane of said vehicle and located to sense bending mode components of said motion having a fixed relative phase sense;
   a time-lag network responsive to the output of said translational accelerometer;
   primary signal combining means interposed between the input of said primary actuator means and the outputs of a command signal source, said angular rate sensor and said time-lag network; and
   secondary signal combining means including time-lag means interposed between the input of said secondary actuator means and the outputs of said angular accelerometer and said angular rate sensor.

References Cited by the Examiner

UNITED STATES PATENTS 3,079,109  2/1963  Jude et al. _____ 244—77
3,132,828  5/1964  Edinger et al. _____ 244—77

OTHER REFERENCES

Gust Alleviator and Rigidity Augmentor for Supersonic Airplanes. I.A.S. Paper No. 62–1, Annual Meeting January 22–24, 1962.

FERGUS S. MIDDLETON, *Primary Examiner.*